United States Patent [19]
Ito et al.

[11] Patent Number: 5,900,222
[45] Date of Patent: * May 4, 1999

[54] PROCESS FOR TREATING NITROGEN OXIDE-CONTAINING GAS USING A CERIUM ZEOLITE

[75] Inventors: Eri Ito, Yamanashi, Japan; Cornelis Maria C.M. van den Bleek, Nootdorn, Netherlands; Herman H. van Bekkum, Vlaardingen, Netherlands; Jacobus Cornelis J.C. Jansen, Delft, Netherlands; Ronald Johannes R.J. Hultermans, Eindhoven, Netherlands; Pieter Martin P. M. Lugt, Vianen, Netherlands

[73] Assignee: Technische Universiteit Delft, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/666,311

[22] PCT Filed: Jan. 2, 1995

[86] PCT No.: PCT/NL95/00001

§ 371 Date: Nov. 19, 1996

§ 102(e) Date: Nov. 19, 1996

[87] PCT Pub. No.: WO95/17949

PCT Pub. Date: Jul. 6, 1995

[30] Foreign Application Priority Data

Dec. 31, 1993 [NL] Netherlands .......................... 9302288

[51] Int. Cl.$^6$ .......................................................... B01J 8/00
[52] U.S. Cl. ............................................................. 423/239.2
[58] Field of Search ............................... 423/239.2, 239.1

[56] References Cited

U.S. PATENT DOCUMENTS 5,116,586   5/1992   Baacke et al. ....................... 423/239.2

*Primary Examiner*—Michael Lewis
*Assistant Examiner*—Thomas G. Dunn, Jr.
*Attorney, Agent, or Firm*—Michaelson & Wallace; Peter L. Michaelson; Edward M. Fink

[57] ABSTRACT

A process is described for treating nitrogen-oxide containing gases at temperature in the range of 300–560° C. in the presence of a cerium containing zeolite catalyst and an excess of an NH-containing compound such as ammonia or an aqueous urea solution as a reducing agent. Excess reducing agent is converted to nitrogen gas during the process. Selective catalytic reduction using ammonia water or an aqueous urea solution as a reducing agent is also described for converting nitrogen oxides in diesel exhaust gas and preventing oxidation of sulfur dioxide.

6 Claims, 4 Drawing Sheets

PROCESS FOR TREATING NITROGEN OXIDE-CONTAINING GAS USING A CERIUM ZEOLITE

BACKGROUND OF THE INVENTION

1. Field of the Invention

The invention relates to a process for treating nitrogen oxide-containing gas substantially having a temperature in the range of 300–560° C., for instance exhaust gas of a diesel engine or the off-gas obtained from gas engines. More particularly, the invention relates to a process wherein nitrogen oxide-containing gas is passed over a zeolite-comprising catalyst system in the presence of a NH-containing compound as reducing agent, in order to obtain a gas containing as few environmentally objectionable or noxious compounds as possible.

Every year, more so-called "Total Energy" plants are installed in greenhouses. The most important source of energy for these plants is natural gas. Such plants are used for heating and for providing electric energy for lighting the greenhouses, for which reason these plants are called heat/power coupling plants. The off-gas of the plant, which has a temperature of up to about 450° C. and which contains a high $CO_2$ content, is essentially suitable to be utilized for fertilizing purposes if this gas is substantially free of nitrogen oxides.

More in detail, the amount of nitrogen oxides in the off-gas of a conventional gas engine will be of the order of 1500–2000 ppm. In order to limit the emission of $NO_x$, typically so-called lean-burn natural gas engines are used in the greenhouses as heat/power coupling plant. These engines are operated with an excess of air to limit the $NO_x$ emission. More particularly, in this manner the $NO_x$ concentration in the off-gases can be reduced from about 1500–2000 ppm to 400–600 ppm. On the other hand, the efficiency of the engines is reduced by the use of an excess of air. Because the off-gases are used for $CO_2$ fertilization in closed spaces, the absolute $NO_x$ concentration in these off-gases must meet high standards. The standard applying in this connection is a maximum of 25–50 ppm $NO_x$. Meanwhile, different catalyst systems have been described which enable the effectuation of $NO_x$ conversions, in such a manner that the $NO_x$ concentration in test systems satisfies the standard mentioned.

The gas engines, however, only deliver a seemingly constant $NO_x$ signal. FIG. 1 shows the amount of NO which is emitted in time by a particular gas engine. At an average $NO_x$ emission level of about 1100 ppm, the signal is found to exhibit a fluctuation of an amplitude of some 100 ppm. This means that in the case or the stationary operation of a process in which $NO_x$ is reduced—which means that a constant stream of the NH-containing compounds is supplied to the off-gas—the standard of 25–50 ppm can only be achieved in the case where a highly complicated and costly control mechanism is employed. A second option, which involves working with an excess of the NH-compound containing reducing agent in order to ensure that a largest possible amount of $NO_x$ is converted is not attractive, since in that case NH-containing compounds slip through along with the treated off-gas. NH compounds are even more noxious than $NO_x$ compounds.

A similar problem presents itself in the treatment of exhaust or off-gases of, for instance, non-stationary diesel engines or other engines of equipments which are operated transiently. Such an engine will be operated highly dynamically, i.e., over time, depending on the load, the $NO_x$ concentration, the gas stream and the temperature of the exhaust gas fluctuate strongly. FIG. 2 gives an impression of these fluctuations. This figure shows a driving cycle or a truck. Plotted along the axes are couple and speed, which parameters can be translated by the skilled person to the gas stream and $NO_x$ concentration.

It will be clear that all this gives problems in regulating the amount of reducing agent which is to be supplied to the catalyst system. These problems could be overcome to a considerable extent if an excess of reducing agent can be used without environmental problems.

Accordingly, there is a need for a process for treating nitrogen oxide-containing gas, wherein nitrogen oxides are reduced in the presence of NH-containing compounds, without the occurrence of any emission (slip) of NH-containing compounds to the environment when these reducing agents are present in excess. More generally, slip of NH compounds is the problem with all known SCR (selective catalytic reduction) processes.

The present invention is directed to an aftertreatment process wherein use is made of a selective catalytic reduction in which a NH-containing compound or composition, for instance ammonia water or an aqueous urea solution, is used as reducing agent.

2. Description of the Related Art

European patent application 0 263 399 describes a method for the catalytic reduction of nitrogen oxides from off-gases coming from power plants and chemical plants. This method relates to a low-temperature deNO$_x$ process, since the nitrogen oxide reduction takes place in the range of 150–350° C. and preferably of 150–280° C. The catalyst which is used in this known method is of the zeolite-Y-type, and in particular of the ion-exchanged zeolite-Y-type. This catalyst is obtained by exchanging ions of sodium zeolite-Y for lithium and/or rare earth ions. One of the possibilities, which, for that matter, is not illustrated in detail, comprises the exchange with Ce ions. Any advantage associated with the use of specifically a CeY zeolite is neither mentioned nor suggested.

SUMMARY OF THE INVENTION

The gases which are to be stripped of nitrogen oxides in accordance with the object of the present invention have a temperature of between 300° C. and 560° C. The method described in EP-A 0 263 399 cannot be used for these gases.

Now a process has been found which enables the treatment of gases having a temperature of between 300 and 560° C., whereby the nitrogen oxide number is reduced and an excess of NH compounds is converted to nitrogen gas.

The invention relates to a process for treating nitrogen oxide-containing gas substantially having a temperature in the range of 300–560° C., in which the gas is passed over a cerium-containing zeolite catalyst in the presence of substantially an excess of a NH-containing compound, for instance ammonia, ammonia water or an aqueous urea solution, as reducing agent, whereby excess reducing agent is converted to nitrogen gas. Preferably, in each case at least a stoichiometric amount of the NH-containing compound is used because in that case substantially all $NO_x$ is reduced.

More particularly, in the process according to the invention use is made of a sodium zeolite (Na zeolite), preferably a non-acid sodium zeolite, at least a part of the sodium ions having been exchanged for cerium ions. The reason is that during the preparation of an acid Na zeolite, there is a danger of the zeolite structure being broken down under the influence of acid. Said CeNa zeolites give a high $NO_x$ conversion, while any excess of NH-compound containing reducing agent is converted to nitrogen gas. It has been found that an excess of up to 30% of the NH-containing compounds can be converted by the cerium-containing zeolite catalyst.

The invention further relates to a process for treating exhaust gas of a diesel engine, wherein the exhaust gas is passed over a cerium-containing zeolite catalyst in the presence of a NH-containing compound, for instance ammonia water or an aqueous urea solution, as reducing agent.

In this embodiment, which also enables working with an excess of NH compounds, a different, novel and surprising property of a cerium-containing zeolite catalyst provides advantages. Tests have shown that the temperature of diesel exhaust gas varies between 100 and 600° C., and between 300 and 560° C. at a normal load. In this temperature range only a slight $SO_2$ oxidation to the munch more noxious $SO_3$ is obtained. The fact that the extent of $SO_2$ oxidation does not increase with a relatively high temperature, while a high $NO_x$ conversion is maintained, is highly surprising. With the currently employed and a number of other tested metal-exchanged zeolites, a high $NO_x$ conversion has been found to be invariably accompanied by a high degree of $SO_2$ oxidation at higher temperatures, as will be demonstrated below.

In the aforementioned temperature range, the $NO_x$ conversion is substantially greater than 80%. The oxidation of $SO_2$ substantially does not exceed 5%. However, the amount of $SO_3$ resulting from this oxidation is mostly much lower than 5%, often even virtually 0%.

BRIEF DESCRIPTION OF THE DRAWING

The invention will be more readily understood by reference to the following detailed description taken in conjunction with the accompanying drawing wherein.

Figure 1:
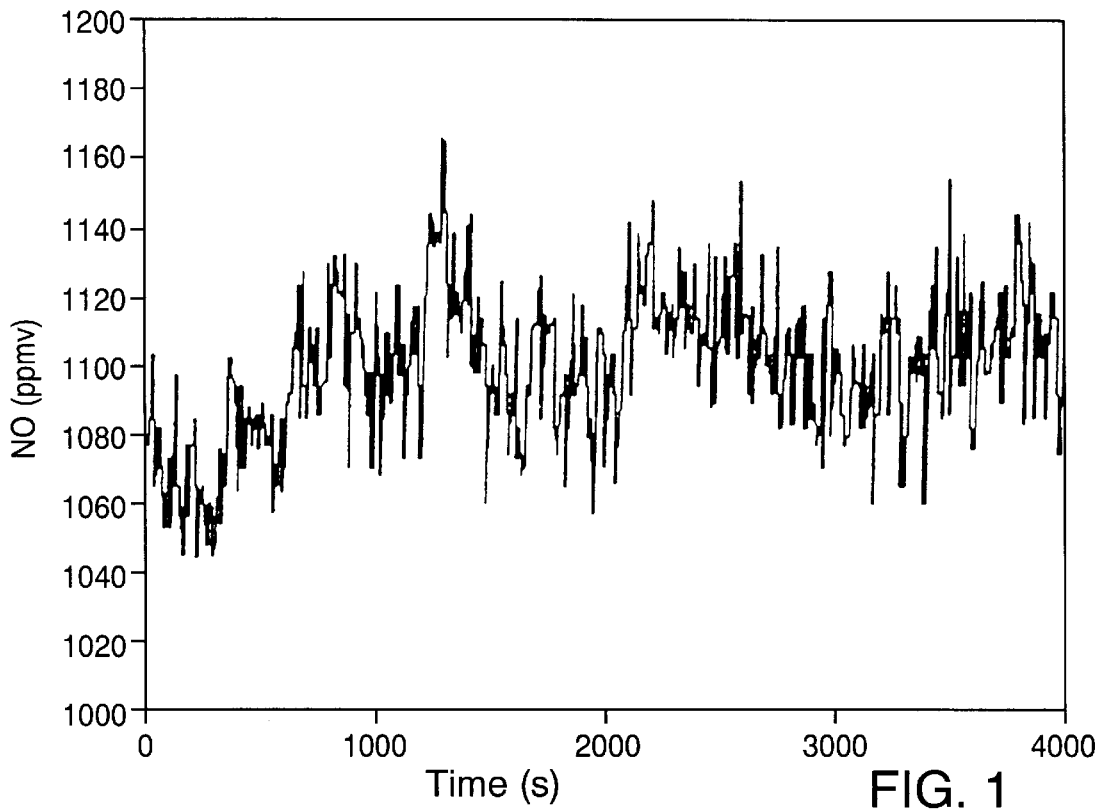
FIG. 1 is a graphical representation on coordinates of nitrogen oxide in ppmv against time in seconds showing the volume of nitrogen oxide emitted over a time frame of 4000 seconds.
Figure 2:
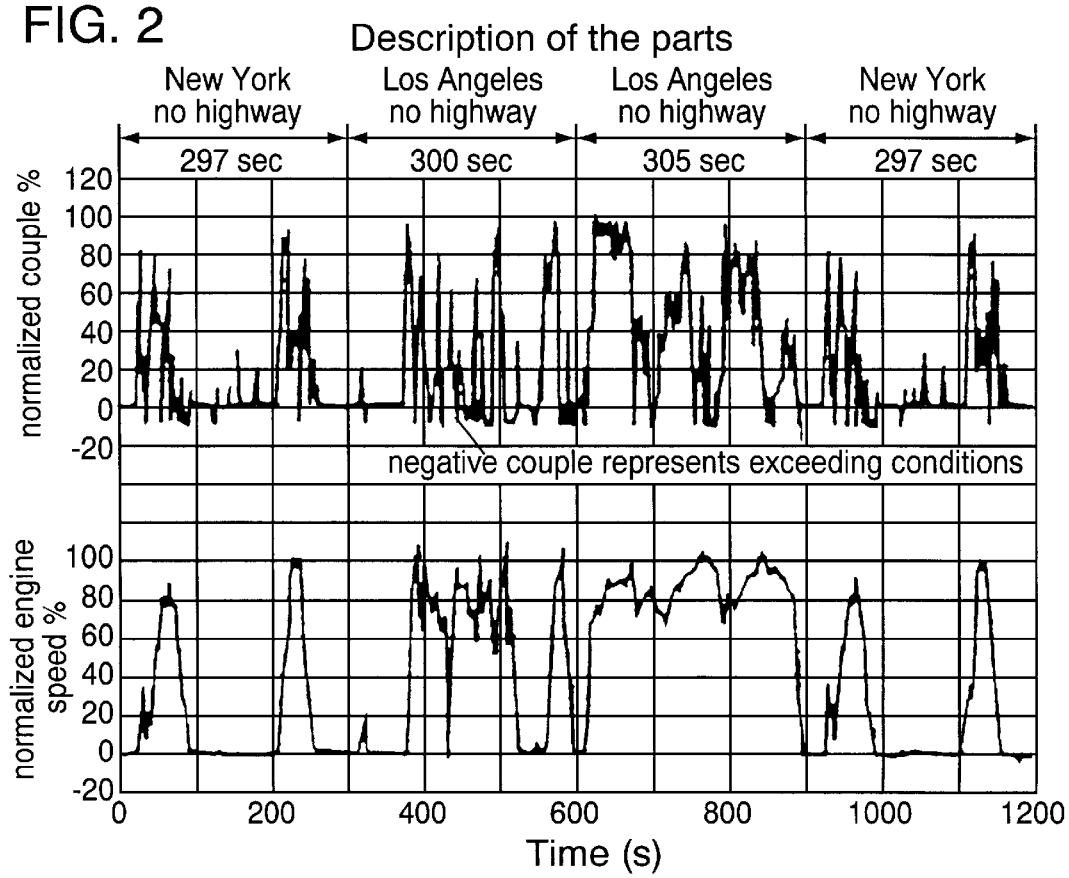
FIG. 2 is a graphical representation on coordinates of time in seconds against normalized engine speed and normalized couple percentage for the driving cycle of a truck under urban highway and non-highway conditions.

Selective catalytic reduction of nitrogen oxides in which NH-containing compositions such as ammonia water or an aqueous urea solution are injected into a reaction space was originally developed for off-gases of power plants. For reasons of safety, in a non-process technological environment, the use of an urea solution as a reducing agent is preferred. The catalysts which are used in this known method are useful in the temperature range of 300–425° C. The lower temperature limit is determined by ammonium sulfate formation in the off-gases of power plants, while the upper limit is determined by $NH_3$ oxidation as a result of which actually more nitrogen oxides are formed, and by the stability of the catalyst used.

In addition, cerium-containing zeolite catalysts are known from the literature. In the Japanese patent application (kokai) 2-99143, a metal-exchanged zeolite of the mordenite-type is used as catalyst in the removal of $NO_x$ from boiler gas through reduction with $NH_3$. This zeolite satisfies the general formula

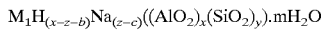

wherein M can represent Ce in addition to inter alia Cr, Zn, La, Ta, Hf, In, Fe and Nb. The valence of M is equal to $(b+c)/1$; and further: $(z-c)/x \leq 0.35/1$, $1/x \geq 0.3/1$, and $y/x \geq 5/1$. These catalysts typically contain protons and are therefore often of the acid type. Such acid zeolite catalysts are suitable to be used at relatively high temperatures of up to 700° C., conventional for boiler gas. Not in any manner can a skilled person derive from this publication that precisely the choice of cerium ions in the zeolite structure leads to a zeolite catalyst which is capable of converting any excess of NH-containing compound over the nitrogen oxides into nitrogen gas. Not in any manner does this publication teach a skilled person that CeNaMOR can be used advantageously in relatively contaminated diesel exhaust gas, which has a relatively low temperature. Nor is it indicated or suggested in this publication that the catalysts described do not convert sulfur dioxide to sulfur trioxide.

It is noted that U.S. Pat. No. 4,867,954 discloses a method for the catalytic reduction of nitrogen oxides in a gas stream. This gas stream may moreover contain one or more sulfur oxides. In this known method, use can be made of a very large number of microporous molecular sieve compounds, including CeY zeolite. The molecular sieve compounds to be used must be treated with an organic or inorganic acid; then hydrogen-forming cations as well as metal cations are exchanged. Although it is noted that $SO_2$ has no influence on the conversion of the nitrogen oxides, it is not in any manner described or suggested that this compound is not oxidized to form $SO_3$ and sulfuric acid. Applicant has performed tests using catalysts described in U.S. Pat. No. 4,867,954—for instance Cu mordenite and FeZSM-5—in which $SO_2$ is in effect oxidized to form $SO_3$ and $H_2SO_4$. Moreover, the required treatment of the molecular sieve compounds is not carried out in the process according to the present invention.

In an article in Shokubai 35 (1993), 122, Yokoyama, Yasuda and Misono describe a method for the reduction of NO in the presence of CeZSM-5 utilizing a hydrocarbon as reducing agent. Hydrocarbons are less strong reducing agents than $NH_3$ or urea. The activity or selective catalytic reduction methods in which the last-mentioned reducing agents are used is much higher. Further, the article of Yokoyama et al. does not point to the sulfur dioxide problem, let alone to the conversion of redundant NH compounds in nitrogen gas.

Essentially, any Na zeolite in which at least a part of the sodium ions have been exchanged for cerium ions can be used as long as this zeolite does not oxidize $NH_3$ or urea to nitrogen oxides. With the term 'zeolite' a large variety of crystalline aluminosilicates are designated, which have a specific pore structure. In a preferred embodiment of the process of the invention, a zeolite catalyst of the type mordenite (CeNaMOR), ZSM-5 (CeNaZSM-5) or Y (CeNaY) is used.

Although zeolite catalysts are satisfactory in the process according to the invention when at least a part of the sodium ions is exchanged for cerium ions, it is preferred to use as zeolite catalyst a zeolite of which at least 10% of the sodium ions in the zeolite crystal have been exchanged for cerium ions. More preferably, as zeolite catalyst a zeolite is used of which more than 30%, for instance 50–100%, more preferably 70–100%, most preferably 100% of the sodium ions have been exchanged for cerium ions.

As stated, the off-gas or exhaust gas of diesel engines which is treated in accordance with the process of the invention substantially has a temperature of between 300 and 560° C. Only at the start-up of the diesel engine and at very high load will the temperature lie outside this range. In both exceptional cases, however, the operating temperature will soon end up in the usual range referred to.

The known selective catalytic reduction systems which were developed for power plants cannot simply be used for treating diesel exhaust gas. At a normal load of a warmed-up diesel engine, for instance of a truck engine, the temperature will substantially be in the temperature range of from 300 to 550° C. Although a large part of this temperature range overlaps the range in which the known power plant catalysts are active, there remains an important part where these known catalysts do not work. It is precisely in this relatively small range that by far the most $NO_x$ is formed.

Furthermore, the temperature of exhaust gases varies depending on the load of the engine, while the temperature of an off-gas from a power plant is more or less constant. This requires for a diesel exhaust system a catalyst which does not give any problems upon frequent and quick operating temperature fluctuations.

In addition, the composition of an off-gas from a power plant is fairly constant. The composition of diesel exhaust gas, on the other hand, varies depending on the load of the engine. At low loads, as opposed to high loads, relatively little nitrogen oxide is formed. With the known catalysts, all this requires a fairly critical control of the reducing agent feed. The catalyst system utilized in the process of the invention requires a much less critical control. An excess of NH-compound containing reducing agent, which excess is determined with respect to the nitrogen oxides to be reduced, is converted to the environmentally harmless nitrogen gas.

At high loads, and so at high engine temperatures, using the known catalysts, sulfur trioxide is formed from sulfur dioxide present in the exhaust system. Sulfur trioxide is capable of forming drops of sulfuric acid with water present in the exhaust gas. These sulfur trioxide and/or sulfuric acid drops are emitted, which has an adverse environmental effect.

Accordingly, the process according to the invention in which diesel exhaust gases or other sulfur- and $NO_x$-containing gases, for instance off-gases or power plants, are passed over a cerium-containing zeolite catalyst, has important advantages. The reduction of nitrogen oxides is effected in a broad temperature range to a sufficiently high degree of conversion, in particular a $NO_x$-conversion of more than 80%, for instance more than 90%. Sulfur dioxide is substantially not converted to sulfur trioxide. As appears from Example 2 below, furthermore any excess of $NH_3$ is broken down to form $N_2$ and $H_2O$.

It is noted that selective catalytic reduction methods for the treatment of exhaust gases of gasoline engines are already known. In the exhaust system of a gasoline engine, using known catalysts, carbon monoxide and hydrocarbons which are present in the exhaust gas as a result of an incomplete combustion, are used to reduce nitrogen oxides. The catalysts which are used must be active at a higher temperature than catalysts for diesel exhaust gases. In addition, exhaust gas of gasoline engines contains no soot and considerably less sulfur compounds than diesel exhaust gas. Known catalysts, for instance Rh-Pt-Pd on alumina, which are used for gasoline gases, do not work in an oxygen-rich environment.

In the combustion space and hence in the exhaust system of a diesel engine, much more oxygen gas, usually in the form of air, must be present than with a gasoline engine. As a result, with diesel engines the reaction of carbon monoxide and hydrocarbons with $NO_x$ cannot take place.

An important advantage of the cerium-containing zeolites which are used according to the invention is the prevention of the escape of any excess of ammonia from the catalyst and exhaust system. Without wishing to be bound to a particular theory, it is supposed that in the presence of cerium-containing zeolites excess $NH_3$ is converted to $N_2$. In known catalyst systems, excess $NH_3$ is converted in the presence of $O_2$ to nitrogen oxides. Accordingly, the invention also relates to the use of a cerium-containing zeolite catalyst for the convertion of ammonia to nitrogen gas.

The invention further relates to the use of a cerium-containing zeolite catalyst in a selective catalytic reduction method in which a NH-containing compound, for instance ammonia water or an aqueous urea solution, is used as reducing agent, for the conversion of nitrogen oxides in diesel exhaust gas and the substantial prevention of the oxidation of sulfur dioxide.

In order to be used in the methods and uses according to the invention, the cerium-containing zeolite catalysts can for instance be provided on a monolith-like structure. Such a structure causes a lowest possible pressure drop.

Figure 3:
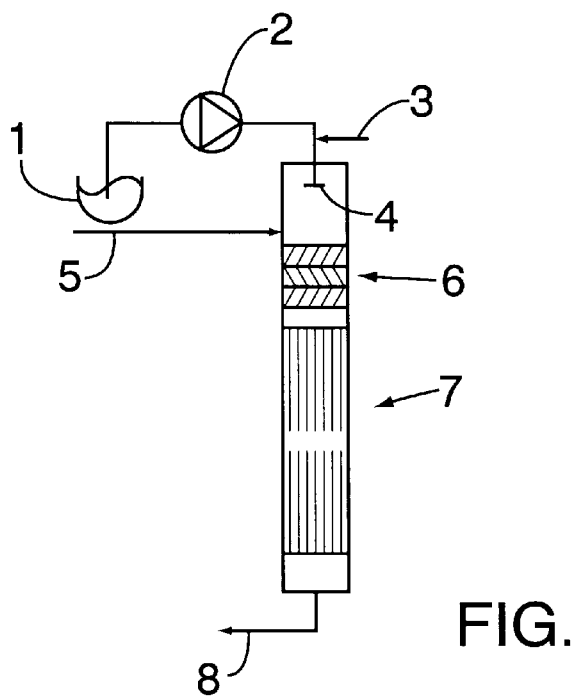
FIG. 3 is a flow diagram of a system suitable for use in the practice of the present invention.

The system just described is depicted in FIG. 3. A urea/water solution is injected from tank 1 through pump 2 and nozzle 4, directly into the exhaust gas stream 5. Via line 3 compressed air is supplied for the purpose of atomizing the urea solution. Then urea reacts with $NO_x$ and inter alia decomposition arises, whereby ammonia-like products are formed. A good mixture of these products with the bulk stream is effected by static mixers 6. The stream is then passed over the SCR-catalyst 7, where $NO_x$ and NH-containing compounds are converted to the non-noxious products nitrogen gas and water, The invention will now be further explained in and by the following examples.

EXAMPLE 1

Preparation of Cerium-containing Zeolites

Into 1.5 liters of an aqueous solution of 0.95 g cerium(III) acetate was introduced 8 g mordenite in the sodium form (marketed by PQ Zeolite, $SiO_2/Al_2O_3$=13.1). This solution was maintained at 100° C. for 5 hours. Then the solutions were filtered, and washed with 250 ml water. After drying at 120° C., the cerium content of this zeolite was determined to be 3.2% by weight. This corresponds with a Ce/Na exchange percentage of 41% (41% of the sodium ions are replaced by cerium ions).

The cerium content was determined as follows. Zeolite sample treated with a solution of $HF-H_2SO_4$, whereby the zeolite structure was broken. De composition was then subjected to a fluid elemental analysis technique (ICP-AES: Inductive coupled plasma-atomic emission spectroscopy).

This test was repeated using (a) 8 g ZSM-5 (commercially available from Uetikon, $SiO_2/Al_2O_3$=40) and (b) 8 g zeolite Y (Akzo, $SiO_2/Al_2O_3$=5.2). For (a) the cerium content was determined to be 0.366% by weight (metal exchange percentage 39.3%); for (b) the cerium content is 9.7% by weight (metal exchange percentage 64.5%).

EXAMPLE 2

A cerium-containing mordenite catalyst as prepared in Example 1 was tested for nitrogen monoxide reduction using an excess of $NH_3$. Results were compared with those obtained with an equimolar ratio ($NH_3/NO=1.0$).

To that end, the reactant gases were introduced into a gas mixing chamber by means of flow controllers and mixed there. The so obtained gas was then passed at a total gas velocity of 400 ml/min. through a reactor which contained 1.0 g catalyst in a bulk bed. The product gas was then analysed in conventional manner in an analysis section.

In the following Table 1 the measured values are shown for test 1 ($NH_3/NO=1.3$, NO=406 ppm, $NH_3$=526 ppm, $O_2$=1% by volume) and test 2 ($NH_3/NO=1.0$, NO=465 ppm, $NH_3$=465 ppm, $O_2$=1% by volume). "N.D." stands for "not determined".

TABLE 1

Conversion percentages of NO and $NH_3$

| Test | Converted product | 300° C. | 400° C. | 500° C. | 560° C. |
|---|---|---|---|---|---|
| 1 | NO | 100 | 100 | 100 | 100 |
|   | $NH_3$ | 96.5 | N.D. | 97.5 | N.D. |
| 2 | NO | 86 | 87 | 89 | 87 |
|   | $NH_3$ | 96 | 92 | 95 | N.D. |

This table shows that with an excess of $NH_3$ over NO of 1.3, invariably a conversion of $NH_3$ of more than 92% is found. In Table 1 100% converted NO means that an amount of NO less than the detection limit of the chemoluminescence analysis equipment leaves the exhaust.

EXAMPLE 3

The catalysts prepared according to Example 1 were cared with the commercially available catalyst DN 110 (a vanadium-containing catalyst (10% $V_2O_5$ on alumina) from Rhône-Poulenc) and a copper-exchanged mordenite catalyst. The last-mentioned catalyst was prepared in the manner of Example 1, with 15 g NaMOR with 10.4 g copper(II) acetate being introduced into 1.5 liters of water; the exchange takes place at room temperature for 19 hours, and a CuNaNOR zeolite is obtained with 3.7% by weight (metal exchange percentage 68%).

The measurements were performed on a test system consisting of argon with 1000 ppm $NH_3$, 1000ppm NO and 5% $O_2$ (column selectivity in Table 2) and in a system with 500 ppm $SO_2$ and 5% $O_2$ (column $SO_2$ oxidation in Table 2). De results are shown in Table 2 below.

TABLE 2

|  | NO conversion | Selectivity: | $SO_2$ oxidation | |
|---|---|---|---|---|
| Catalyst | (>80%) | $N_2O$ formed | ≦400° C. | ≦600° C. |
| DN 110 | up to 400° C. | <120 ppm | 20% | — |
| CuNaMOR | up to 400° C. | <50 ppm | 50% | — |
| CeNaMOR | up to 600° C. | <25 ppm | 0% | <5% |
| CeNaZSM-5 | up to 600° C. | <25 ppm | 0% | <5% |
| CeNaY | up to 600° C. | <10 ppm | 0% | <5% |

These results show that cerium-containing zeolites give a high NO reduction activity in a broad temperature range. In addition, the undesired side reaction whereby $N_2O$ is formed arises to a lesser extent than with the known catalysts.

It further appears that cerium-containing zeolites give a very low $SO_2$ oxidation. In this connection it is observed that the $SO_2$ oxidation with the cerium-containing zeolites at a temperature of 400° C. was 0%.

EXAMPLE 4

In the laboratory set-up described in Example 2, using diesel exhaust gas, the following catalysts were tested: the copper-containing and the cerium-containing mordenite catalyst described in Example 2 and the commercially available DeNO$_x$ catalyst DN 32 ($V_2O_5/TiO_2/WO_3$) of Degussa A. G. The exhaust gas came from a small single cylinder diesel engine, of the marc Yanmar, L90E Single Cylinder Vertical DI Diesel Engine (400 cc), to which a so-called reference diesel was supplied. This reference diesel, CEC Legislative Fuel RF-03-A-84, had a density of 0.8421 kg/l, a cetane number of 49, contained 0.27% by weight of sulfur. The engine mentioned produces a maximum output of 4 kWh, and gives a soot production of 23 g/u. The exhaust gas contained 50 ppm $SO_2$, while the NO$_x$ emission was 665 ppm at full power and 3000 rpm.

Figure 4:
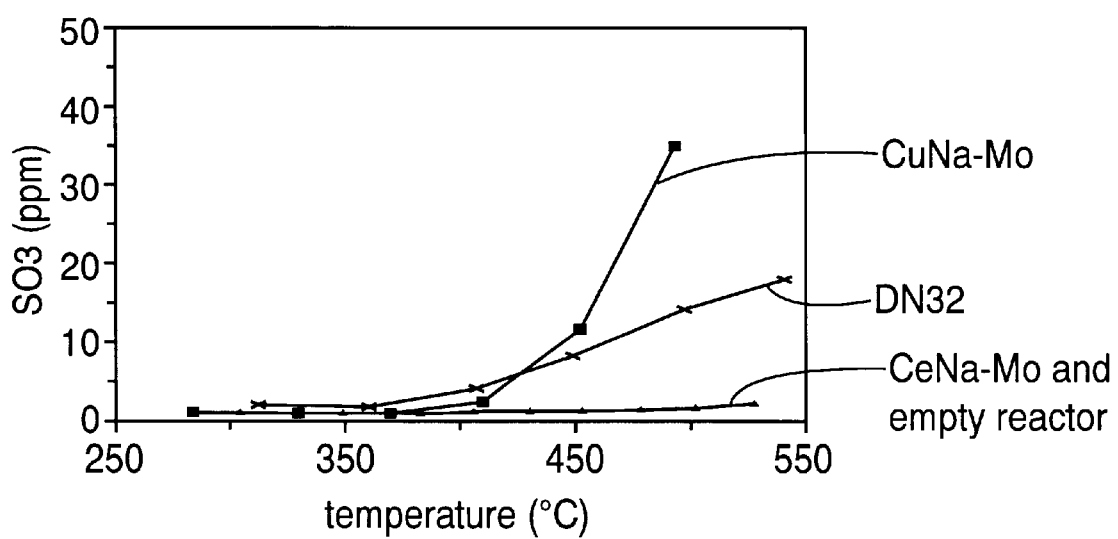
FIG. 4 is a graphical representation on coordinates of temperature in degrees Centigrade against sulfur trioxide in ppm for copper containing cerium containing mordenite and a commercially available vanadium/titanium/tungsten oxide catalyst used to treat diesel exhaust gases in accordance with the invention.

It appears from FIG. 4 that only the cerium-containing catalyst performs excellently.

EXAMPLE 5

Mordenite (PQ Zeolite; $SiO_2/Al_2O_3=13.1$) was introduced at a temperature of 85° C. into aqueous solutions of (a) cerium(III) acetate (3.09 mM) and (b) lanthanum trichloride (1.93 mM), and subsequently treated as described in Example 1. Obtained was a CeNaMOR in which 58% of the sodium ions had been replaced by cerium(III) ions; and a LaMOR in which 57% of the sodium ions had been replaced by lanthanum ions.

A part of the so prepared cerium(III) zeolite was subjected for 4 hours to a calcination at 560° C. in argon which contained 20% oxygen. Thus a catalyst was obtained which contained more than 50% Ce(IV) ions. H-MOR was prepared by introducing the commercially available mordenite in the sodium form into an ammonium chloride solution and allowing exchange of all sodium ions for ammonium ions. Then this ammonium zeolite was calcined at 500° C. for 36 hours.

These catalysts were tested in an automated "benchtop" reactor system (Autoclave Engineers, BTRS-900) in a conventional fixed-bed set-up with 1 g catalyst pellets, which pellets had a diameter of 0.5 mm, in a quartz tube. A test gas comprising argon including 465 ppm NO, 465 ppm $NH_3$ and 1% $O_2$ was supplied to this system at a flow velocity of 400 ml/min. The gas obtained after the treatment in the catalyst system was tested for NO conversion in an NO$_x$ analyzer (Signal, Signal 4000).

Figure 5:
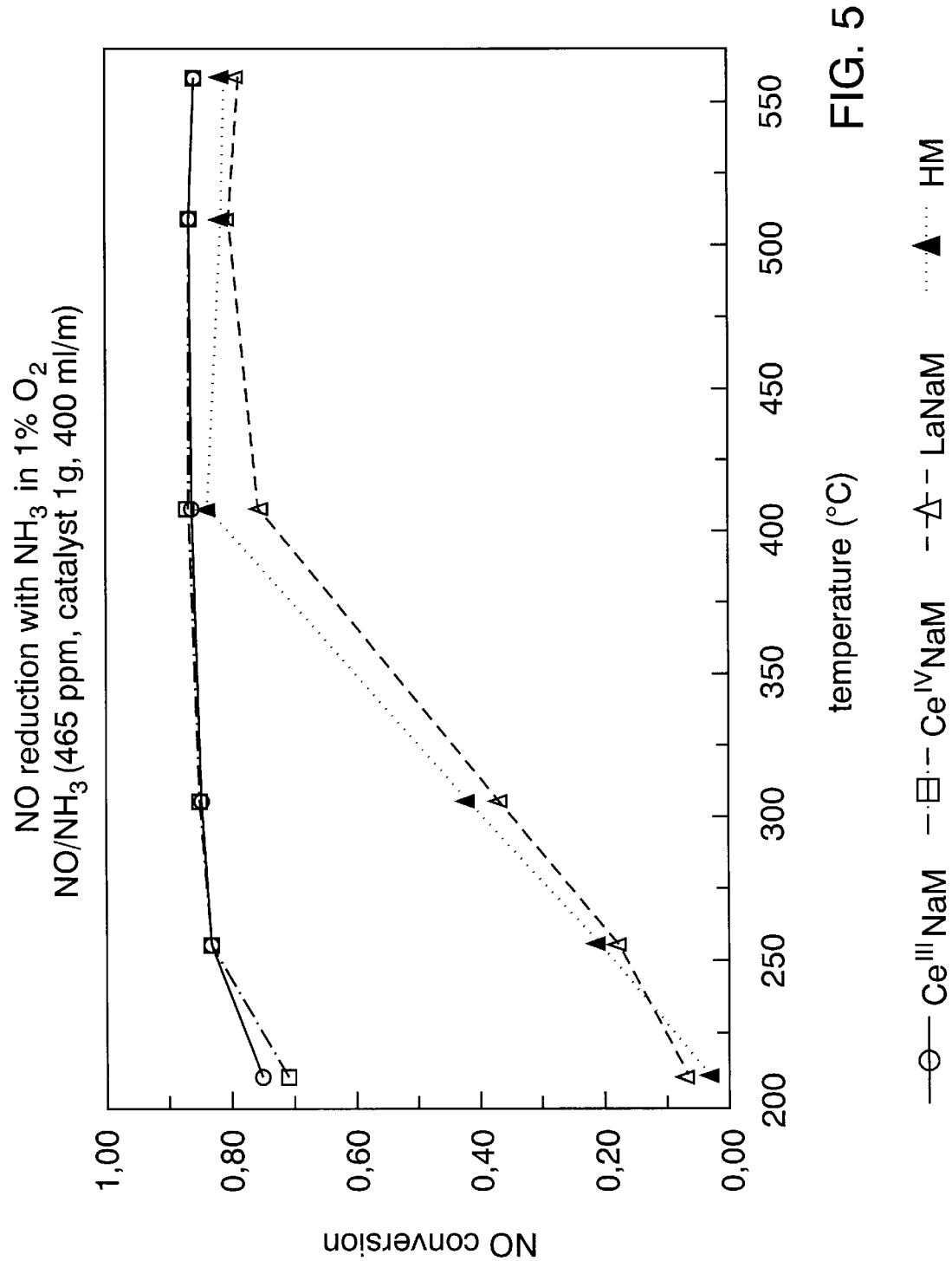
FIG. 5 is a graphical representation on coordinates of temperature in degrees Centigrade against nitrogen oxide conversion for different catalysts.

The NO conversion which was found for the catalysts mentioned is visualized in FIG. 5.

EXAMPLE 6

Figure 6:
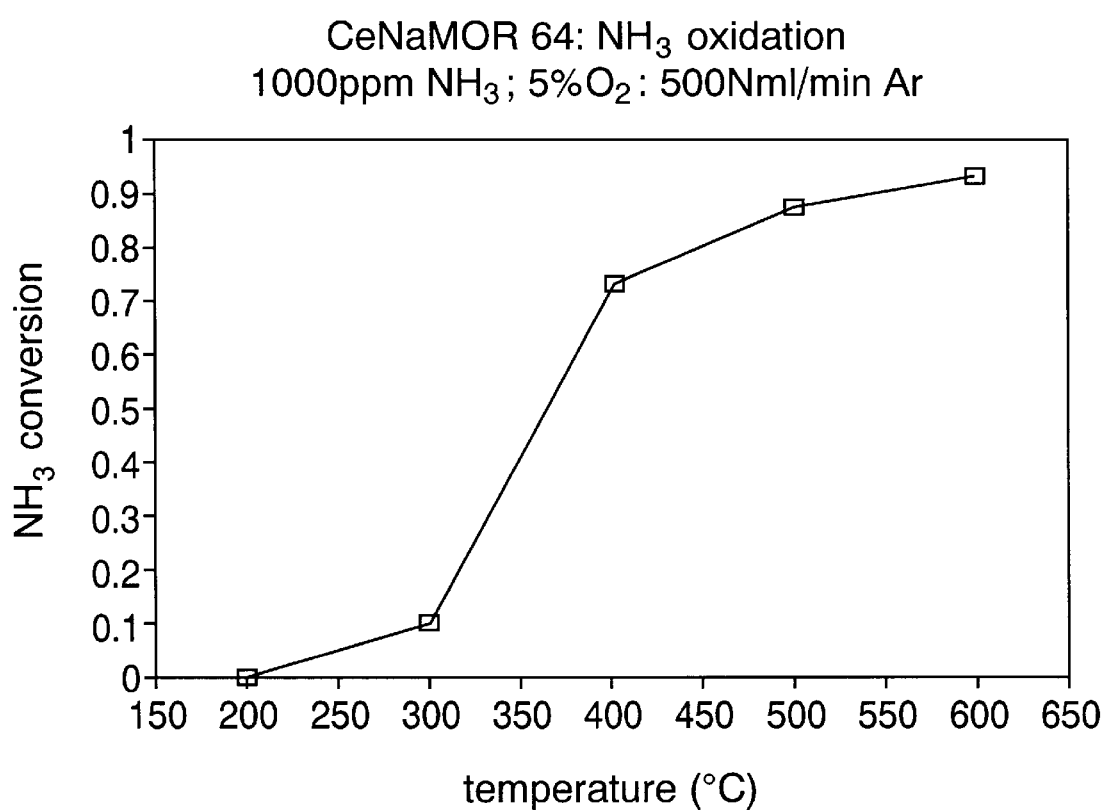
FIG. 6 is a graphical representation on coordinates of temperature in degrees Centigrade against ammonia conversion showing conversion thereof to nitrogen oxides during the practice of the invention.

A CeNaMOR catalyst in which 64% of the sodium ions had been exchanged for zeolite was used in a test system, and as test gas argon comprising 5% $O_2$ and 1000 ppm $NH_3$ was passed over the catalyst. In FIG. 6 the ammonia conversion is plotted against the temperature. This shows that in the process according to the invention any excess of NH-containing compounds supplied to the exhaust system are decomposed and converted to nitrogen gas.

If, in addition to $NH_3$, $NO_x$ is present, these compounds react with each other. Apparently only NH compounds which are present in excess are broken down.

We claim:

1. A process for treating a nitrogen oxide-containing gas having a temperature in the range of 300–500° C. wherein the gas is passed over a catalyst comprising a sodium zeolite in which at least 10% of the sodium ions have been exchanged for cerium ions in the presence of a reducing agent comprising an excess of an NH-containing compound, the excess reducing agent being converted to nitrogen gas.

2. A process in accordance with claim 1 wherein the zeolite catalyst is selected from the group consisting of mordenite, ZSM-5 and Y.

3. A process in accordance with claim 1 wherein 50–100% of the sodium ions in the zeolite catalyst have been exchanged for cerium ions.

4. A process in accordance with claim 3 wherein the nitrogen oxide-containing gas comprises sulfur and $NO_x$ and the oxidation of sulfur dioxide is prevented.

5. A process in accordance with claim 4 wherein the sulfur and $NO_x$-containing gas is selected from the group consisting of exhaust gas from a diesel engine and off-gas from a power plant.

6. A process in accordance with claim 1 wherein the NH-containing compound is selected from the group consisting of ammonia water and an aqueous urea solution.

* * * * *